United States Patent
Fujii

(10) Patent No.: US 7,026,953 B2
(45) Date of Patent: Apr. 11, 2006

(54) KEYLESS ENTRY DEVICE HAVING TIRE PRESSURE MONITORING FUNCTION

(75) Inventor: Shohei Fujii, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 184 days.

(21) Appl. No.: 10/241,914

(22) Filed: Sep. 11, 2002

(65) Prior Publication Data

US 2003/0046993 A1 Mar. 13, 2003

(30) Foreign Application Priority Data

Sep. 13, 2001 (JP) ............................. 2001-278447

(51) Int. Cl.
*B60C 23/00* (2006.01)
(52) U.S. Cl. .................. 340/870.16; 340/444; 340/447
(58) Field of Classification Search ........ 340/444–447, 340/870.16, 426.13–426.16, 5.61–5.64; 73/146.2, 73/146.3, 146.4, 146.5
See application file for complete search history.

(56) References Cited

U.S. PATENT DOCUMENTS

| | | | | |
|---|---|---|---|---|
| 5,463,374 A | | 10/1995 | Mendez et al. | |
| 5,500,637 A | * | 3/1996 | Kokubu | ....................... 340/447 |
| 5,661,651 A | * | 8/1997 | Geschke et al. | ............... 701/88 |
| 5,963,128 A | * | 10/1999 | McClelland | ................. 340/447 |
| 6,417,766 B1 | * | 7/2002 | Starkey | ....................... 340/447 |
| 6,446,023 B1 | * | 9/2002 | Ernst | ........................... 702/138 |
| 6,476,712 B1 | * | 11/2002 | Achterholt | .................... 340/447 |
| 6,604,415 B1 | * | 8/2003 | Imao et al. | .................. 73/146.5 |
| 6,604,416 B1 | * | 8/2003 | Tsujita | ....................... 73/146.5 |
| 6,633,620 B1 | * | 10/2003 | Taguchi et al. | ............. 375/360 |
| 6,650,236 B1 | * | 11/2003 | Ghabra et al. | .............. 340/447 |
| 6,744,357 B1 | * | 6/2004 | Itou et al. | .................... 340/445 |
| 6,885,282 B1 | * | 4/2005 | Desai et al. | ................ 340/5.61 |

* cited by examiner

*Primary Examiner*—Michael Horabik
*Assistant Examiner*—Kimberly Jenkins
(74) *Attorney, Agent, or Firm*—Brinks Hofer Gilson & Lione

(57) ABSTRACT

A keyless entry device includes a plurality of antennas which receive high frequency signals, a high frequency receiver which reproduces data from the high frequency signals received by the plurality of antennas, an intermittent controller which changes over an operation of the high frequency receiver between a continuous operation and an intermittent operation in an interlocking manner with turning on or off of an ignition key of an automobile, and a data processor which outputs data as control signals, wherein when the ignition key is turned on, the keyless entry device is operated as the tire pressure monitoring device and when the ignition key is turned off, the keyless entry device is operated as the keyless entry device.

1 Claim, 2 Drawing Sheets

KEYLESS ENTRY DEVICE HAVING TIRE PRESSURE MONITORING FUNCTION

This application claims the benefit of priority to Japanese Patent Application 2001-278447, filed on Sep. 13, 2001.

BACKGROUND OF THE INVENTION

1. Field of the Invention

The present invention relates to a keyless entry device having a tire pressure monitoring function, and more particularly to a keyless entry device having a tire pressure monitoring function whose operation is changed over between an operation as a tire pressure monitoring device and an operation as a keyless entry device in an interlocking manner with turning on and off of an ignition key of an automobile.

2. Description of the Related Art

Conventionally, as devices mounted on an automobile, there have been known a keyless entry device and a tire pressure monitoring device. To describe the constructions of these devices, the keyless entry device includes a vehicle-mounted transmission/reception unit which is mounted on the automobile and one or more portable transmission/reception units which an owner or the like individually carries. When a normal high frequency signal is transmitted from the portable transmission/reception unit and the vehicle-mounted transmission/reception unit receives the high frequency signal, opening/closing of an automobile door is performed or starting of an engine is performed. On the other hand, the tire pressure monitoring device includes a vehicle-mounted receiver which is mounted on an automobile and a plurality of small transmitters which are mounted on respective tires, wherein when a normal high frequency signal of equal to or more than a fixed level is transmitted from a plurality of small transmitters and the vehicle-mounted receiver receives the high frequency signal, the abnormality of air pressure or the abnormality of tire temperature of specific tires can be detected.

The above-mentioned known keyless entry device performs only functions peculiar to the keyless entry device, that is, opening/closing of an automobile door or starting of an engine without using a key by manipulating the portable transmission/reception unit. On the other hand, the above-mentioned known tire pressure monitoring device performs only functions peculiar to the tire pressure monitoring device, that is, detecting of the abnormality of air pressure of specific tires and the abnormality of tire temperature and the activation of an alarm when the abnormality is detected. Accordingly, to achieve both of the function of the keyless entry device and the function of the tire pressure monitoring device, it is indispensable to separately mount the keyless entry device and the tire pressure monitoring device on the vehicle.

On the other hand, inside the automobile, usually, various types of driving manipulation members and measuring equipment such as meters which are considered to be necessary for driving are arranged so that there is no tolerance in space. Accordingly, when the keyless entry device and the tire pressure monitoring device are separately mounted, it is rather difficult to select their mounting positions. Furthermore, when two devices consisting of the keyless entry device and the tire pressure monitoring device are individually mounted on the automobile, this surely pushes up the cost considerably.

SUMMARY OF THE INVENTION

The present invention has been made in view of such a technical background and it is an object of the present invention to provide a keyless entry device having a tire pressure monitoring function, wherein a keyless entry device and a tire pressure monitoring device are integrally formed so that, compared to a case in which the two devices are mounted individually, the two devices can be easily mounted in terms of space and the keyless entry device is also advantageous in terms of cost.

To achieve above-mentioned object, the keyless entry device having a tire pressure monitoring function according to the present invention includes a plurality of antennas which receive high frequency signals from a portable unit or tire pressure transmitters, a high frequency receiver which reproduces data from the high frequency signals received by a plurality of antennas, an intermittent controller which changes over an operation of the above-mentioned high frequency receiver between a continuous operation and an intermittent operation in an interlocking manner with turning on or off of an ignition key of an automobile, and a data processor which outputs the above-mentioned data as control signals, wherein when the ignition key is turned on, the intermittent controller changes over the operation of the high frequency receiving unit to the continuous operation and, data processor is operated as a tire pressure monitoring device which outputs control signals in response to data from the tire pressure transmitters, while when the ignition key is turned off, the intermittent controller changes over the operation of the high frequency receiving unit to the intermittent operation and, the data processor is operated as a keyless entry device which outputs control signals in response to data from the portable unit.

Due to such a constitution, the constitutional members which can be used in common between the keyless entry device and the tire pressure monitoring device are used in common and remaining constitutional members are individually arranged so that the keyless entry device having a tire pressure monitoring function can be miniaturized as a whole. Further, when the ignition key is turned off, the keyless entry device having a tire pressure monitoring function is operated as the keyless entry device, while when the ignition key is turned on, the keyless entry device having a tire monitoring function is operated as a tire pressure monitoring device so that it is possible to obtain the device which functions as the keyless entry device as well as the tire pressure monitoring device. Accordingly, compared to a case in which the keyless entry device and the tire pressure monitoring device are mounted individually, it is possible to obtain the keyless entry device having a tire pressure monitoring function which facilitates mounting of the device in terms of space and is also advantageous in terms of cost.

Further, in the state that the ignition key is turned off, the high frequency receiver is subjected to the intermittent operation so that the reduction of power consumption can be realized, while in the state the ignition key is turned on, the high frequency receiver is subjected to the continuous operation so that the abnormality of the tire pressure can be quickly detected. In this manner, even when the keyless entry device having a tire pressure monitoring function is operated as the keyless entry device as well as the tire pressure monitoring device, respective functions are not deteriorated.

Here, a mainunit of the above-mentioned constitution further includes an antenna changeover part. When the intermittent controller changes over the operation of the high frequency receiver to the continuous operation, the intermittent controller simultaneously changes over an operation of the antenna changeover part to an operation in which supply of high frequency signals to the high frequency receiver from a plurality of respective antennas is periodically changed over, while when the intermittent controller changes over the operation of the high frequency receiver to the intermittent operation, the intermittent controller simultaneously changes over the operation of the antenna changeover part to the operation in which supply of high frequency signals to the high frequency receiver from the plurality of antennas is intermittently turned on in synchronism with the intermittent operation of the high frequency receiver.

Due to such a constitution, when the keyless entry device having a tire pressure monitoring function is operated as the tire pressure monitoring device, it is possible to distinguish the specific antenna from which the high frequency signal is supplied to the high frequency receiver and the specific tire which mounts the tire pressure transmitter from which data is supplied so that the tire which suffers from the abnormality can be distinguished. On the other hand, when the keyless entry device having a tire pressure monitoring function is operated as the keyless entry device, it is possible to have an advantageous effect that, irrespective of the direction from which the high frequency signals from the portable unit reaches the automobile, such signals can be surely detected. That is, while ensuring both of the function of the keyless entry device and the function of the tire pressure monitoring device, it is possible to obtain operational conditions optimum to perform respective functions.

DESCRIPTION OF PREFERRRED EMBODIMENT

Preferred embodiments of the present invention are explained hereinafter in conjunction with attached drawings.

Figure 1:
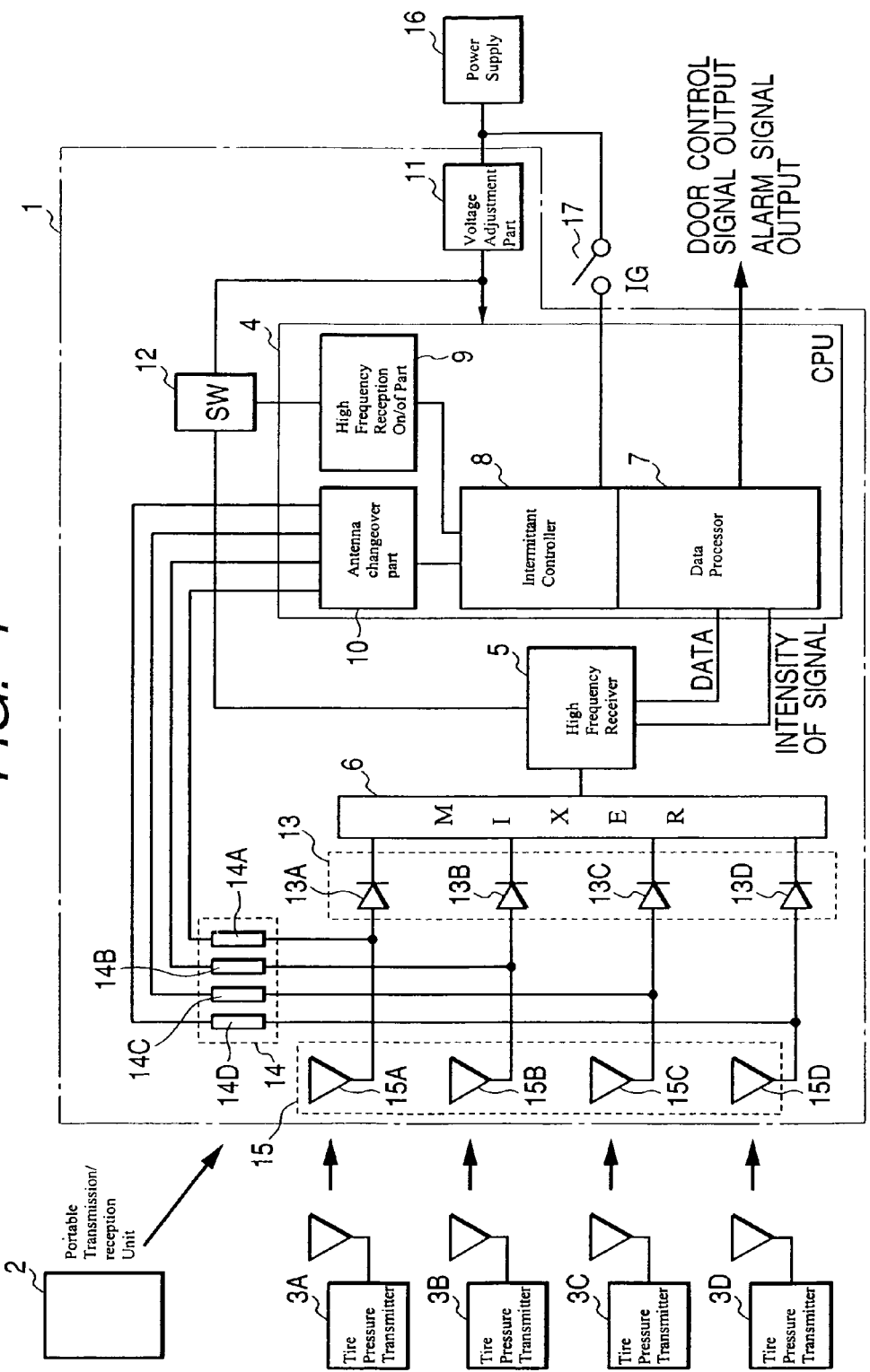
FIG. 1 is a block diagram showing the constitution of an essential part of one embodiment of a keyless entry device having a tire pressure monitoring function according to the present invention.

FIG. 1 is a block diagram showing the constitution of an essential part of one embodiment of a keyless entry device having a tire pressure monitoring function according to the present invention.

As shown in FIG. 1, the keyless entry device having a tire pressure monitoring function according to this embodiment includes a mainunit 1, a portable transmission/reception unit (portable unit) 2 used for keyless entry, and a tire pressure transmitter 3A, a tire pressure transmitter 3B, a tire pressure transmitter 3C, and a tire pressure transmitter 3D which are respectively used for tire pressure monitoring. Further, the mainunit 1 includes a controller (CPU) 4 which incorporates a data processor 7, an intermittent controller 8, a high frequency reception ON/OFF part 9 and an antenna changeover part 10 therein, a high frequency receiver 5, a mixer 6, a voltage adjustment part (REG) 11, a power supply switch (SW) 12, a diode changeover part 13 consisting of a diode 13A, a diode 13B, a diode 13C and a diode 13D, a changeover voltage supply part 14 consisting of a resistance 14A, a resistance 14B, a resistance 14C and a resistance 14D, and a high frequency reception antenna 15 consisting of an antenna 15A, an antenna 15B, an antenna 15C and an antenna 15D. In addition to these constitutional components, as constitutional components outside the device, the keyless entry device is further provided with a vehicle-mounted power supply 16 and an ignition key (IG) 17.

In this case, an owner of an automobile or the like carries the portable transmission/reception unit 2 and one or more portable transmission/reception units 2 are prepared for one mainunit 1. The tire pressure transmitters 3A to 3D are respectively mounted on portions of wheels which are arranged at different positions of the automobile where the measurement can be performed such as tire valves, valve tubes of the tire valves or wheel rims. For example, the tire pressure transmitter 3A is mounted on the right front wheel, the tire pressure transmitter 3B is mounted on the left front wheel, the tire pressure transmitter 3C is mounted on the right rear wheel and the tire pressure transmitter 3D is mounted on the left rear wheel. Further, the antennas 15A to 15D are mounted at positions where these antennas can receive high frequency signals transmitted from corresponding tire pressure transmitters 3A to 3D respectively by way of the shortest distance. For example, the antenna 15A is positioned in the vicinity of the right front wheel on which the tire pressure transmitter 3A is mounted, the antenna 15B is positioned in the vicinity of the left front wheel on which the tire pressure transmitter 3B is mounted, the antenna 15C is positioned in the vicinity of the right rear wheel on which the tire pressure transmitter 3C is mounted, and the antenna 15D is positioned in the vicinity of the left rear wheel on which the tire pressure transmitter 3D is mounted. Here, it is preferable to use signals having frequency of several 100 MHz band as usable high frequency signals.

In the mainunit 1, the high frequency receiver 5 has an input end thereof connected to an output end of the mixer 6, a data output end thereof connected to a data input end of the data processor 7, a signal strength output end thereof connected to a signal strength input end of the data processor 7, and a power supply input end thereof connected to an output end of the power supply switch 12. With respect to the mixer 6, a first input end is connected to a cathode of the diode 13A, a second input end is connected to a cathode of the diode 13B, a third input end is connected to a cathode of the diode 13C, and a fourth input end is connected to a cathode of the diode 13D. The data processor 7 is coupled to the intermittent controller 8 and has a signal output end thereof connected to an external controlled device (not showing in the drawing). The intermittent controller 8 has an input end thereof connected to the external ignition key 17, a first output end thereof connected to the input end of the high frequency reception ON/OFF part 9, and a second output end thereof connected to an input end of the antenna changeover part 10. The high frequency reception ON/OFF part 9 has an output end thereof connected to a control end of the power supply switch 12. The antenna changeover part 10 has a first output end thereof connected to one end of the resistance 14A, a second output end thereof connected to one end of the resistance 14B, a third output end thereof connected to one end of the resistance 14C, and a fourth output end thereof connected to one end of the resistance 14D. The voltage adjustment part 11 has an input end thereof connected to the external vehicle-mounted power supply 16 and an output end thereof respectively connected to a power supply input end of the controller 4 and to an input end of the power supply switch 12. In the diode changeover part 13, the diode 13A has an anode thereof connected to the other ends of the resistance 14A and the antenna 15A, the diode 13B has an anode thereof connected to the other end of the resistance 14B and the antenna 15B, the diode 13C has an anode thereof connected to the other end of the resistance 14C and the antenna 15C, and the diode 13D has an anode thereof connected to the other end of the resistance 14D and the antenna 15D. In addition to the above-mentioned connections, the external vehicle-mounted power supply 16 is connected to the external ignition key 17.

The keyless entry device having a tire pressure monitoring function of this embodiment having such a constitution is operated as follows.

When a driver rides the automobile and turns on the ignition key 17, electric power is supplied from the vehicle-mounted power supply 16 to the intermittent controller 8 of the controller 4 through the ignition key 17 in the ON state and hence, the controller 4 assumes the tire pressure monitoring device operation mode. In this operation mode, the controller 4 receives high frequency signals transmitted from four tire pressure transmitters 3A to 3D. When the controller 4 assumes the tire pressure monitoring device operation mode, the first control signal (continuous control signal) is supplied to the high frequency reception ON/OFF part 9 and the antenna changeover part 10 respectively from the intermittent controller 8. In response to the supply of the first control signal, the high frequency reception ON/OFF part 9 supplies the continuous control signal to the power supply switch 12 and direct current electric power which is outputted from the voltage adjustment part 11 is continuously supplied to the high frequency receiver 5 through the power supply switch 12 so as to bring the high frequency receiver 5 into the continuous operation state. On the other hand, the antenna changeover part 10 generates control signals which change over four diodes 13A to 13D from the OFF state to the ON state in sequence at the first to fourth output ends in response to the supply of the first control signal.

That is, when the control signal is generated at the first output end in the first cycle, the control signal is supplied to the diode 13A through the resistance 14A and hence, the diode 13A is selectively turned on. Accordingly, the high frequency signal received by the antenna 15A is supplied to the mixer 6 through the diode 13A and is supplied to the high frequency receiver 5 from the mixer 6. Then, when the control signal is generated at the second output end in the second cycle, the control signal is supplied to the diode 13B through the resistance 14B and hence, the diode 13B is selectively turned on. Accordingly, the high frequency signal received by the antenna 15B is supplied to the mixer 6 through the diode 13B and is supplied to the high frequency receiver 5 from the mixer 6. Subsequently, when the control signal is generated at the third output end in the third cycle, the control signal is supplied to the diode 13C through the resistance 14C and hence, the diode 13C is selectively turned on. Accordingly, the high frequency signal received by the antenna 15C is supplied to the mixer 6 through the diode 13C and is supplied to the high frequency receiver 5 from the mixer 6. Subsequently, when the control signal is generated at the fourth output end in the fourth cycle, the control signal is supplied to the diode 13D through the resistance 14D and hence, the diode 13D is selectively turned on. Accordingly, the high frequency signal received by the antenna 15D is supplied to the mixer 6 through the diode 13D and is supplied to the high frequency receiver 5 from the mixer 6. Thereafter, four diodes 13A to 13D return to the first cycle and the above-mentioned operations are repeatedly executed.

The high frequency receiver 5 detects the signal strength (electric field strength) of the high frequency signals which are sequentially supplied from four tire pressure transmitters 3A to 3D and samples data contained in the high frequency signals and supplies the detected signal strength and the sampled data to the data processor 7.

Figure 2:
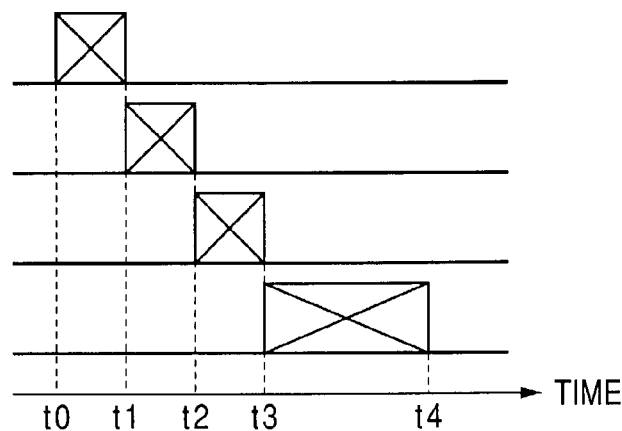
FIG. 2 is an explanatory view showing one example of an operation in which a high frequency receiver sequentially obtains high frequency signals in a tire pressure monitoring device operation mode in the keyless entry device having a tire pressure monitoring function shown in FIG. 1.

Here, FIG. 2 is an explanatory view showing one example of an operation when the high frequency receiver 5 sequentially obtains the high frequency signals in the keyless entry device having a tire pressure monitoring function shown in FIG. 1.

In FIG. 2, the characteristics of the first stage indicate a conductive period of the diode 13A in the first cycle, the characteristics of the second stage indicate a conductive period of the diode 13B in the second cycle, the characteristics of the third stage indicate a conductive period of the diode 13C in the third cycle, and the characteristics of the fourth stage indicate a conductive period of the diode 13D in the fourth cycle. Time is taken on the axis of abscissas.

As indicated by the first stage shown in FIG. 2, during the period from time t0 to time t1, the high frequency signal in the first cycle is supplied to the data processor 7. Then, as indicated by the second stage shown in FIG. 2, during the period from time t1 to time t2, the high frequency signal in the second cycle is supplied to the data processor 7. Subsequently, as indicated by the third stage shown in FIG. 2, during the period from time t2 to time t3, the high frequency signal in the third cycle is supplied to the data processor 7. Here, when the signal strengths of respective high frequencies signal are all below a given value, the controller 4 determines that normal high frequency signals are not received as the high frequency signals in the first to third cycles and performs the control such that the conductive periods of the diodes 13A to 13C allocated to the first to third cycles through the intermittent controller 8 and the antenna changeover part 10 assume the relatively short period such as the period from time t0 to time t1, the period from time t1 to time t2, and the period from time t2 to time t3. On the other hand, as shown in the fourth stage of FIG. 2, after time t3, the high frequency signal in the fourth cycle is supplied to the data processor 7. Here, when the signal strength of the high frequency signal becomes equal to or more than a given value, the controller 4 determines that a normal high frequency signal is received as the high frequency signal in the fourth cycle and performs the control such that the conductive period of the diodes 13D allocated to the fourth cycle through the intermittent controller 8 and the antenna changeover part 10 assumes the period from time t3 to time t4 which is longer than the previously-mentioned three periods. That is, the controller 4 performs the control such that all high frequency signals in the fourth cycle can be fetched in the high frequency receiver 5.

The data processor 7 executes, as mentioned previously, the discrimination of the signal strength detected by the high frequency receiver 5 and the selective outputting or stopping of outputting of the alarm signal based on data sampled from the high frequency receiver 5. Here, when the signal strength is equal to or below a given value or even when the signal strength is above a given value but data which indicates the abnormality of the tire pressure or the tire temperature is not contained in the data, the alarm signal is not supplied to an external alarm device and hence, an alarm operation by the alarm device is not performed. To the contrary, in the data processor 7, when the signal strength is above a given value and data which indicates the abnormality of the tire pressure or the tire temperature is contained in data, the alarm signal is supplied to the external alarm device and the alarm operation is performed by the alarm device. Accordingly, it is possible to inform a driver or the like of the fact that the tire pressure of the specific wheel has become abnormal or the fact that temperature of the specific tire is abnormally elevated due to a certain cause so that the driver can readily know the generation of the abnormality of the wheel at an initial stage whereby the driver can promptly take a suitable countermeasure to cope with the situation.

Subsequently, assume a case in which the driver does not ride on the automobile and the driver is just about to ride on the automobile. In such a circumstance, when the ignition key 17 is turned off, the supply of electric power from the vehicle mounted power supply 16 is prevented by the ignition key 17 in the OFF state and hence, electric power is not supplied to the intermittent controller 8 of the controller 4 whereby the controller 4 assumes the keyless entry device operation mode and is ready for receiving the high frequency signals transmitted from the portable transmission/reception unit 2. When the controller 4 assumes the keyless entry device operation mode, the second control signals (intermittent control signals) are supplied to the high frequency reception ON/OFF part 9 and the antenna changeover part 10 respectively from the intermittent controller 8. When the second control signal, that is, the intermittent control signal which sets the intermittent interval at the intermittent controller 8 is supplied to the high frequency reception ON/OFF part 9, the high frequency reception ON/OFF part 9 performs the intermittent control of the power supply switch 12 in response to the intermittent control signal so that the direct current electric force outputted from the voltage adjustment part 11 is intermittently supplied to the high frequency receiver 5 through the power supply switch 12 whereby the high frequency receiver 5 is brought into the intermittent operation state. On the other hand, the antenna changeover part 10 generates the intermittent control signals which change over four diodes 13A to 13D to the ON state intermittently and simultaneously in response to the supply of the second control signal at the first to fourth output ends.

The high frequency receiver 5 assumes an OFF state, that is, an inoperative state when the direct current electric power from the power supply switch 12 is intermittently stopped. Here, in synchronism with shifting of the high frequency receiver 5 to the inoperative state, control signals which turn off four diodes 13A to 13D are also outputted from the first to fourth output ends of the antenna changeover part 10. Accordingly, the supply of the high frequency signals which are transmitted from the portable transmission/reception unit 2 and received by any one or more of four antennas 15A to 15D to the high frequency receiver 5 is stopped. On the other hand, when the high frequency receiver 5 assumes an ON state, that is, an operative state due to the electric power intermittently supplied to the high frequency receiver 5 from the power supply switch 12, control signals which turn on four diodes 13A to 13D are also outputted from the first to fourth output ends of the antenna changeover part 10 and the high frequency signals which are transmitted from the portable transmission/reception unit 2 in synchronism with the shifting of operation mode to the operative mode in the high frequency receiver 5 and received by any one or more of four antennas 15A to 15D are supplied to the high frequency receiver 5 and the high frequency signals are processed in the high frequency receiver 5.

The reason why the four diodes 13A to 13D are not made to assume the ON state intermittently but are made to assume the ON state simultaneously in the keyless entry device operation mode is as follows. That is, the high frequency signals transmitted from the portable transmission/reception unit 2 arrive at the automobile from any direction. Accordingly, to make the keyless entry device having a tire pressure monitoring function cope with such a situation, the keyless entry device is configured such that even when the high frequency signals are received by any one, two or more antennas out of four antennas 15A to 15D, the high frequency signals are supplied to the high frequency receiver 5.

Also in this case, the high frequency receiver 5 detects the signal strength (electric field strength) of the high frequency signals supplied from the portable transmission/reception unit 2, samples data contained in the high frequency signals, and supplies the detected signal strength and the sampled data to the data processor 7.

Figure 3:
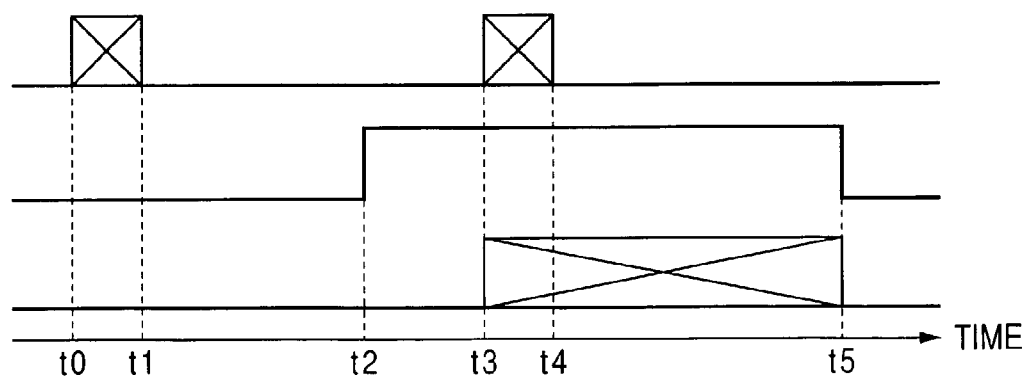
FIG. 3 is an explanatory view showing one example of an operation in which a high frequency receiver obtains high frequency signals in a keyless entry device operation mode in the keyless entry device having a tire pressure monitoring function shown in FIG. 1.

FIG. 3 is an explanatory view showing one example of an operation of the keyless entry device capable of also functioning as the tire pressure monitoring device shown in FIG. 1 when the high frequency receiver 5 obtains the high frequency signals transmitted from the portable transmission/reception unit 2.

In FIG. 3, the characteristics of the first stage indicate a period of ON control with respect to the second control signal, the characteristics of the second stage indicate a period of a high frequency signal supplied from the portable transmission/reception unit 2, the characteristics of the third stage indicate an operation time of the high frequency receiver 5 and a conductive period of the diodes 13A to 13D when the normal high frequency signal is received, and time is taken on the axis of abscissas.

As indicated by the first stage shown in FIG. 3, the high frequency receiver 5 assumes an operative period during the period from time t0 to t1 and, at the same time, the diode 13A to 13D also assume a conductive period. Within this period, the portable transmission/reception unit 2 does not transmit the high frequency signals. Accordingly, the high frequency receiver 5 does not receive the high frequency signals and hence, the operation is finished at time t1. As indicated by the second stage in FIG. 3, when the time reaches time t2, the portable transmission/reception unit 2 transmits the high frequency signals. However, at this point of time, the high frequency receiver 5 assumes the inoperative period and the diodes 13A to 13D assume the non-conductive period and hence, the high frequency receiver 5 does not receive the high frequency signals. Subsequently, as indicated by the first stage in FIG. 3, when the time arrives at time t3, the high frequency receiver 5 assumes the operative period and, at the same time, the diodes 13A to 13D also assume the conductive period.

Here, the high frequency signals transmitted from the portable transmission/reception unit 2 are received by any one of four antennas 15A to 15D. When the high frequency signals are supplied to the high frequency receiver 5 in the operative state through the diodes 13A to 13D in the ON state, the high frequency receiver 5 detects the signal strength of the high frequency signals. When the signal strength of the high frequency signals is equal to or more than a given value, the controller 4 determines that the normal high frequency signals are received as high frequency signals and performs the following control. That is, as indicated by the third stage shown in FIG. 3, the operative periods of the high frequency receiver 5 and the conductive period of the diodes 13A to 13D at this point of time are controlled through the intermittent controller 8 and the antenna changeover part 10 such that they are prolonged as in the case of a period from time t3 to time t5 compared to the original operative period and the conductive period, that is, the period from time t0 to time t1 and the period from time t3 to time t4. That is, the operative periods and the conductive periods are controlled such that all high frequency signals can be fetched into the high frequency receiver 5 within the period.

Also in this case, the data processor 7 executes the discrimination of signal strength detected by the high frequency receiver 5 and selectively executes outputting of control signals or stopping of outputting of control signals based on data sampled at the high frequency receiver 5. That is, even under the condition that the signal strength of the high frequency signal is equal to or below a given value or the signal strength of the high frequency signal is equal to or above the given value, when the data does not contain data for performing given control, control signals are not supplied to an external controlled device such as a door lock mechanism so that the operation of the door lock mechanism is not performed. On the other hand, when the signal strength of the high frequency signals is equal to or above the given value and data for performing the given control is contained in data with respect to the data processor 7, in the same manner as the usual keyless entry device, the control signals are supplied to the external controlled device such as the door lock mechanism and the door lock mechanism or the like is operated in response to the control signals so that a locked door is unlocked or an unlocked door is locked.

In this manner, the keyless entry device having a tire pressure monitoring function according to this embodiment constitutes a device which has the function of the keyless entry device as well as the function of the tire pressure monitoring device. Accordingly, the keyless entry device can be easily mounted on and can be miniaturized thus realizing reduction of cost.

As has been described heretofore, according to the present invention, the constitutional members which can be used in common between the keyless entry device and tire pressure monitoring device are used in common and remaining constitutional members are individually arranged so that the keyless entry device having a tire pressure monitoring function can be miniaturized as a whole. Further, when the ignition key is turned off, the keyless entry device having a tire pressure monitoring function is operated as the keyless entry device, and when the ignition key is turned on, the keyless entry device having a tire pressure monitoring function is operated as the tire pressure monitoring device so that the keyless entry device also has the functions as the tire pressure monitoring device so that it is possible to obtain the device which functions as the keyless entry device as well as the tire pressure monitoring device. Accordingly, compared to the case in which the keyless entry device and the tire pressure monitoring device are mounted individually, it is possible to obtain the keyless entry device having a tire pressure monitoring function which facilitates mounting of the device in terms of space and is advantageous in terms of cost.

What is claimed is:

1. A keyless entry device having a tire pressure monitoring function comprising a portable unit, tire pressure transmitters which are respectively mounted on a plurality of tires and a mainunit, wherein the mainunit includes a plurality of antennas which receive high frequency signals from the portable unit and the tire pressure transmitters, a high frequency receiver which reproduces data from the high frequency signals received by the plurality of antennas, an intermittent controller which changes over operation of the high frequency receiver between continuous operation and intermittent operation in an interlocking manner with turning on or off of an ignition key of an automobile, and a data processor which outputs the data as control signals, wherein when the ignition key is turned on, the intermittent controller changes over operation of the high frequency receiver to continuous operation and the data processor outputs control signals in response to data from the tire pressure transmitters and does not output control signals in response to data from the portable unit, wherein when the ignition key is turned off, the intermittent controller changes over operation of the high frequency receiver to intermittent operation and the data processor outputs control signals in response to data from the portable unit, wherein the mainunit further includes an antenna changeover part, wherein when the intermittent controller changes over operation of the high frequency receiver to continuous operation, the antenna changeover part changes over a plurality of respective antennas from an OFF state to an ON state in sequence, and wherein when the intermittent controller changes over the high frequency receiver to intermittent operation, the antenna changeover part intermittently and simultaneously turns the plurality of antennas to the ON state in synchronism with the intermittent operation of the high frequency receiver.

* * * * *